Patented Jan. 26, 1943

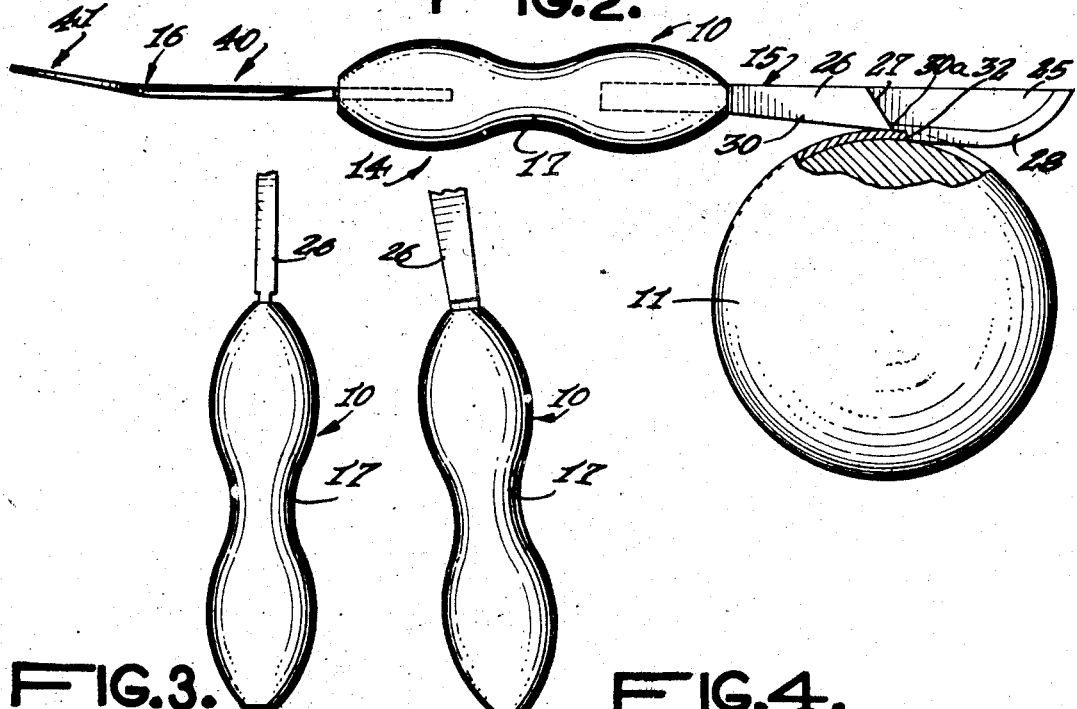
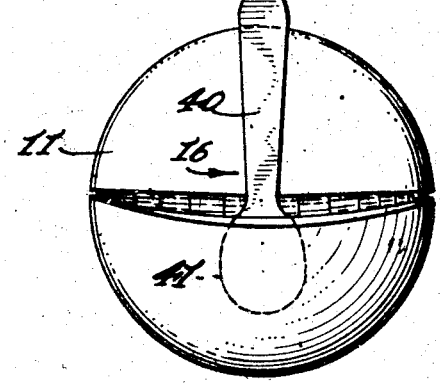
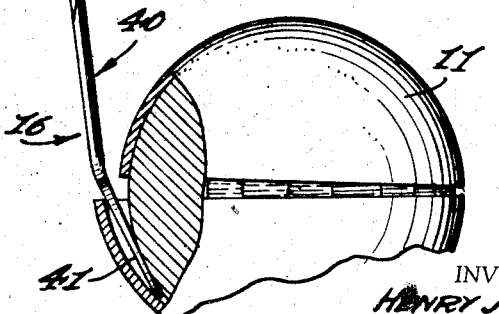

2,309,177

UNITED STATES PATENT OFFICE 2,309,177

ORANGE AND GRAPEFRUIT PEELER

Henry J. Eifler, New York, N. Y.

Application May 15, 1941, Serial No. 393,613

5 Claims. (Cl. 30—24)

This invention relates to orange and grapefruit peeler.

An object of this invention is to provide a peeling instrument of the character described comprising a handle having at one end, a knife with which an orange peel may be cut circumferentially, the knife having means to prevent the blade from going beyond the peel, and means at the other end of the handle insertable through the circumferential cut on the peel for working the peel away from the fruit.

Another object of this invention is to provide a highly improved instrument of the character described which shall be relatively inexpensive to manufacture, easy to manipulate, attractive in appearance, and yet practical and efficient to a high degree in use.

Other objects of this invention will in part be obvious and in part hereinafter pointed out.

The invention accordingly consists in the features of construction, combinations of elements, and arrangement of parts which will be exemplified in the construction hereinafter described, and of which the scope of application will be indicated in the following claims.

In the accompanying drawing, in which is shown one of the various possible illustrative embodiments of this invention, Fig. 1 is a top plan view of an instrument embodying the invention;

Fig. 2 is a side elevational view thereof illustrating the method of circumferentially cutting the orange rind;

Fig. 3 is a perspective view illustrating the method of working the rind away from the fruit, after the rind is cut circumferentially; and Fig. 4 is a side elevational view illustrating the method of carrying out the operation shown in Fig. 3, with parts of the orange broken away.

Referring now in detail to the drawing, 10 designates an instrument embodying the invention for peeling an orange or grapefruit 11. The instrument 10 comprises a handle 14 carrying at the opposite ends thereof blades 15 and 16 respectively.

The handle 14 may have a central constricted portion 17 to facilitate sliding of the handle when using either one blade or the other.

The blade 15 is generally in a plane at right angles to the blade 16, as in Figs. 1 and 2 of the drawing. Said blade 15 has a thin cutting portion 25 at its front end and a thickened portion 26 at its rear end. Between the thicker portion 26 and the thinner portion 25, and on opposite sides of blade portion 25, are forwardly and downwardly inclined surfaces 27. The lower edge 28 of blade portion 25 has a cutting edge, and is forwardly and upwardly rounded. The underside 30 of blade portion 26 is flat. The entire blade 15 increases in height from rear to front up to a point where the cutting edge 28 begins to curve upwardly.

It will be noted furthermore that the cutting edge 28 extends downwardly below the forward end of flat surface 30a forming a sharp heel 32 just in advance of said forward end.

The method of using the cutting blade 15 to cut the rind of an orange circumferentially is illustrated in Fig. 2 of the drawing, and will now be explained.

The cutting is done with the cutting edge 28 particularly with the portion thereof adjacent the heel 32. The heel portion 32 of the blade is embedded into the orange and the knife is pulled rearwardly as the orange is turned to cut into the rind.

It will be noted that the forward portion of the flat surface 30 acts as a stop to prevent the cutting edge from becoming embedded into the meat of the orange. In this manner, the orange may be cut circumferentially and the orange is prepared for the next operation by the blade 16.

The blade 16 has a rear portion 40 and a forward portion 41. The rear portion 40 is substantially in alignment with the upper edge of blade 15. The blade portion 41 of blade 16 is substantially oval shape and is inclined forwardly and upwardly at an angle to blade portion 40, as clearly shown in Fig. 2 of the drawing. Said blade portion furthermore slightly decreases in thickness toward its outer end. The edge of blade portion 41 is dull.

After the rind of the orange is cut circumferentially, blade portion 41 may be inserted between the rind and the meat of the orange, as indicated in Fig. 4, the instrument being held so that the blade 41 is inclined toward the axis of the orange. The instrument may then be worked all round the orange to loosen the rind from the meat of the orange. After a substantial portion of the rind is loosened from the meat of the orange, it may be taken off as a whole. The orange may then be turned around and the same operation repeated for the upper half of the rind. In this manner, the two hemispherical portions of the rind may be peeled from the rind, and the center or meat of the orange remains intact as a whole. Obviously, the rind may be peeled in quarters or in any other desirable portions in the same manner as described herein.

It will thus be seen that there is provided a device in which the several objects of this invention are achieved, and which is well adapted to meet the conditions of practical use.

As various possible embodiments might be made of the above invention, and as various changes might be made in the embodiment above set forth, it is to be understood that all matter herein set forth or shown in the accompanying drawing is to be interpreted as illustrative and not in a limiting sense.

Having thus described my invention, I claim as new and desire to secure by Letters Patent:

1. An instrument of the character described comprising a handle, and a blade attached to the handle, said blade having a relatively thin forward portion and a relatively thick rear portion, said forward portion having a cutting edge on its underside, and said rear portion having a flat underedge, said thick rear portion having a forwardly and downwardly inclined surface at its front end on opposite sides of said thin portion.

2. An instrument of the character described comprising a handle, and a blade attached to the handle, said blade having a relatively thin forward portion and a relatively thick rear portion, said forward portion having a cutting edge on its underside, and said rear portion having a flat underedge, said cutting edge extending below the underedge of the rear portion of the blade and being formed with a sharp heel adjacent the forward end of said underedge of said rear portion.

3. An instrument of the character described comprising a handle, and a blade attached to the handle, said blade having a relatively thin forward portion and a relatively thick rear portion, said forward portion having a cutting edge on its underside, and said rear portion having a flat underedge, said cutting edge extending below the underedge of the rear portion of the blade and being formed with a sharp heel adjacent the forward end of said underedge of said rear portion, said blade increasing in height from its rear end toward its front end substantially the major length of the blade.

4. An instrument of the character described comprising a handle, and a blade attached to the handle, said blade having a relatively thin forward portion and a relatively thick rear portion, said forward portion having a cutting edge on its underside, and said rear portion having a flat underedge, said cutting edge extending below the underedge of the rear portion of the blade and being formed with a sharp heel adjacent the forward end of said underedge of said rear portion, said blade increasing in height from its rear end toward its front end substantially the major length of the blade, said thick rear portion having a forwardly and downwardly inclined surface at its front end and on the opposite sides of its thin portion.

5. An instrument of the character described comprising a handle, and a blade attached to the handle, said blade having a relatively thin forward portion and a relatively thick rear portion, said forward portion having a cutting edge on its underside, and said rear portion having a flat underedge, said cutting edge extending below the underedge of the rear portion of the blade and being formed with a sharp heel adjacent the forward end of said underedge of said rear portion, said blade increasing in height from its rear end toward its front end substantially the major length of the blade, said thick rear portion having a forwardly and downwardly inclined surface at its front end and on the opposite sides of its thin portion, said thin portion increasing in thickness from its rear end partly towards its front end.

HENRY J. EIFLER.